United States Patent Office 3,676,062
Patented July 11, 1972

3,676,062
MANUFACTURING METHOD FOR PURE SYNTHETIC CRYOLITE
Koji Taga and Masahiko Noguchi, Kasaoka, Japan, assignors to Konoshima Chemical Co., Ltd., Osaka, Japan
No Drawing. Filed Oct. 7, 1970, Ser. No. 78,991
Claims priority, application Japan, Oct. 11, 1969, 44/81,264
Int. Cl. C01f 7/54
U.S. Cl. 23—88                 2 Claims

ABSTRACT OF THE DISCLOSURE

Synthetic cryolite for use in the refining of aluminum is prepared having less than 1% $SiO_2$ content. The synthesis is carried out with 5–20% of one or more mineral acids at pH 3.5–4.5.

---

The present invention relates to the manufacture of pure synthetic cryolite and in particular to a method of making pure synthetic cryolite containing little or no silicic acid ($SiO_2$).

Cryolite is indispensable in the refining of aluminum and in those countries which have little or no resources of natural cryolite many proposals have been made for the manufacture of synthetic cryolite. In previous processes, the fluorine component of synthetic cryolite has been obtained from chemically decomposed fluorite and other fluorine-containing minerals or from by-products obtained in the manufacture of calcium super-phosphate and refining or condensing wet process phosphoric acid. In these cases it has been nearly impossible to avoid contamination by silicic acid in the fluorine materials and contamination by this impurity in synthetic cryolite will cause serious inconvenience and disadvantage when it is used for refining aluminum.

In former methods of making synthetic cryolite with low silicic acid content, it has previously been known to form crystalline cryolite from hydrosilicofluoric acid and sodium aluminate while keeping the aluminum in excess. However, this method is not satisfactory in practical economy since it requires the relatively expensive aluminum component in excess.

According to the present invention an economical method of synthesizing cryolite with very low silicic acid content is provided so that it can be particularly used in aluminum refining, in the process of synthesizing cryolite by the reaction of hydrosilicofluoric acid and sodium aluminate, without requiring an excess of the aluminum component.

Thus, the present invention is a method of obtaining synthetic cryolite, in the process of manufacturing synthetic cryolite by the reaction of a fluorine-containing solution which is selected from the group consisting of hydrosilicofluoric acid solution and a mixture of hydrosilicofluoric acid and hydrofluoric acid solutions, and sodium aluminate solution, wherein the reaction is conducted in the presence of one or more mineral acids selected from the group consisting of hydrochloric acid, nitric acid and sulfuric acid, and the crystals that are produced are filtered for separation before drying and calcining.

It has already been well known and widely practiced to synthesize cryolite by the liquid-liquid phase reaction of hydrosilicofluoric acid or hydrofluoric acid and sodium aluminate, but the characteristic feature of the present invention is that a definite amount of one or more mineral acids of hydrochloric, nitric and sulfuric acids is present in carrying out said reaction. The amount of hydrochloric, nitric or sulfuric acid to be present in the reaction system is set forth below.

The amount of hydrochloric, nitric or sulfuric acid required in the reaction system is more than 5% as HCl, $HNO_3$, or $H_2SO_4$ against $H_2SiF_6$ in the hydrosilicofluoric acid solution or a mixed solution of hydrosilocofluoric and hydrofluoric acids. When more than 5% of such mineral acid is present, the effect in removing impurities in the cryolite produced by said reaction is remarkable. This is evident from the following results of experiments which were conducted.

EXPERIMENT A

To a hydrosilicofluoric acid solution containing 8.50% $H_2SiF_6$ ($SiO_2$ 3.53%, $P_2O_5$ 0.0043%, $SO_2$ 0.022%) was added HCl, $HNO_3$ or $H_2SO_4$ in an amount varying against $H_2SiF_6$ to make cryolite ($Na_3AlF_6$) separate by crystallization, which was separated and calcined at 515° C. for 20 minutes before it was analyzed for the content of $SiO_2$. The reaction conditions and the analytical results are given in Table 1.

TABLE 1

| No. | Acid added | Amount added percent | Reaction temperature, °C. | Concentration of crystals formed g./l. | pH | Analyses of formed cryolite percent | | | |
|---|---|---|---|---|---|---|---|---|---|
| | | | | | | F | $SiO_2$ | $P_2O_5$ | $SO_4$ |
| 1 | None | | 60 | 23 | 3.8 | 53.12 | 1.58 | 0.003 | 0.05 |
| 2 | HCl | 3 | 60 | 23 | 4.1 | 53.41 | 1.42 | 0.005 | 0.06 |
| 3 | HCl | 5 | 60 | 23 | 3.8 | 53.65 | 0.96 | 0.012 | 0.05 |
| 4 | HCl | 8 | 60 | 23 | 3.9 | 53.88 | 0.27 | 0.015 | 0.04 |
| 5 | $HNO_3$ | 3 | 60 | 23 | 3.8 | 53.18 | 1.42 | 0.003 | 0.06 |
| 6 | $HNO_3$ | 8 | 60 | 23 | 3.9 | 53.36 | 0.75 | 0.011 | 0.05 |
| 7 | $HNO_3$ | 10 | 60 | 23 | 3.7 | 53.83 | 0.35 | 0.018 | 0.08 |
| 8 | $H_2SO_4$ | 3 | 60 | 23 | 3.9 | 53.46 | 1.56 | 0.004 | 0.05 |
| 9 | $H_2SO_4$ | 8 | 60 | 23 | 4.0 | 53.49 | 0.68 | 0.013 | 0.07 |
| 10 | $H_2SO_4$ | 10 | 60 | 23 | 3.9 | 53.64 | 0.41 | 0.017 | 0.10 |

From these results it is clear that for obtaining less than 1% content of $SiO_2$ in cryolite which is the maximum allowable limit for use in ordinary aluminum refining, not less than about 5% of mineral acid (percent by weight of mineral acid against $H_2SiF_5$ in the solution), must be present. When more severe (lower) allowance limit is required, the amount of mineral acid to be present must naturally be increased, but excessive presence of mineral acid is not only unprofitable economically, but also liable to increase such other impurities of $P_2O_5$ and $SO_4$, and presence of more than about 20% of the acid is not desirable.

In the process of the present invention, hydrochloric, nitric and sulfuric acids may be used singly and in mixtures. In the latter case the amount of mixed acids to be employed is required to be equivalent to that of the case of a single acid.

This is evident from the results of the following experiment:

EXPERIMENT B

The experimental methods were the same as in Experiment A, except that the kind and amount of the acid added were varied. The results of determination of the $SiO_2$ content in the synthetic cryolite obtained are shown in Table 2.

TABLE 2

| Experimental number | Kind and amount of acids added | $SiO_2$ in formed cryolite, percent |
|---|---|---|
| 11 | HCl 3% plus HNO$_3$ 2% | 0.88 |
| 12 | HCl 5% plus HNO$_3$ 5% | 0.33 |
| 13 | HCl 3% plus H$_2$SO$_4$ 2% | 0.96 |
| 14 | HCl 5% plus H$_2$SO$_4$ 5% | 0.48 |
| 15 | HNO$_3$ 3% plus H$_2$SO$_4$ 2% | 0.93 |
| 16 | HCl 3% plus HNO$_3$ 3% plus H$_2$SO$_4$ 3% | 0.42 |
| 17 | HCl 5% plus HNO$_3$ 5% plus H$_2$SO$_4$ 5% | 0.16 |

As explained heretofore, the use of a single or mixed acids totalling more than 5% of hydrochloric, nitric or sulfuric acid or mixtures thereof can achieve the desired elimination or reduction of impurities.

To make hydrochloric, nitric or sulfuric acid, or a mixture of them present in the reaction system, these acids may be added in any suitable form, but when a fluorine-containing solution that contains more than 5% of these acids is used, no addition of these acids is then necessary. When these acids are less than 5%, it is required only to supply the deficiency. Examples of the fluorine-containing solution that orignnally contains hydrochloric, nitric or sulfuric acid, or a mixture of them, may be impure hydrofluoric acid (containing hydrosilico-fluoric acid and sulfuric acid) which is obtained by decomposition of low grade fluorite by sulfuric acid, and impure hydrosilicofluoric acid (containing hydrochloirc, nitric or sulfuric acid or a mixture of them) which is obtained by simple acid decomposition of silicofluoride or its acid decomposition after addition of chloride or nitrate.

Best results are obtained by observing certain conditions in conducting the process of the present invention. In the first place, it is required to make the concentration of crystalline cryolite in suspension, which is formed by the cryolite formation reaction, at least 10–50 g./liter, desirably 20–30 g./liter. Under the conditions where the concentration of the suspending, crystalline cryolite formed is out of the range of 10–50 g./liter, the crystals of cryolite that are formed are difficult to be filtered resulting little effect to reduce the $SiO_2$ content in the produced cryolite. In conducting the method of the present invention it is most desirable to make the concentration of the suspending, crystalline cryolite that is formed about 25 g./liter.

The second point of care is to regulate the pH of the slurry in the cryolite-forming reaction to be within the range of 3.5 to 4.5. If the pH is more alkaline than pH 4.5, $SiO_2$ tends to be gelated while if it is more acidic than pH 3.5, the crystals of formed cryolite are too fine and hence difficult of filtration with the result of little effect of reducing the content of $SiO_2$ in the cryolite.

It is added that in the present invention replacement of sodium aluminate by aluminum hydroxide and sodium hydroxide is quite equal in significance, and is to be understood as within the scope of the present invention.

The invention is further illustrated by the following non-limitative examples.

Example 1

An agitated mixture of an aqueous solution of hydrosilicofluoric acid ($H_2SiF_6$ 8.29%; $P_2O_5$ 0.004%) that is obtained by making the gas, formed as a by-product during manufacturing calcium superphosphate, absorbed into water 9.55 kg./hr. and nitric acid (NHO$_3$ 67.5%) 0.12 kg./hr. (10.2% as NHO$_3$ against $H_2SiF_6$), and sodium aluminate solution (Na$_3$AlO$_3$ 2.40%) 36.1 kg./hr. were added continuously into the reaction vessel to conduct the reaction under agitation and keeping the temperature of 60° C. and pH at 3.9–4.2, and after maintenance for 10 minutes the formed slurry (concentration of suspending cryolite about 23 g./liter) was drawn out of the reaction vessel continuously. The product was concentrated by precipitation in a thickener, centrifuged to remove water, and calcined at 506° C. for 20 minutes to obtain 1.0 kg./hour of synthetic cryolite.

Analytical values of the synthetic cryolite are as follows:

| | Percent |
|---|---|
| $H_2O$ | 0.20 |
| $Na_2O$ | 41.93 |
| $Al_2O_3$ | 26.23 |
| F | 53.25 |
| $SiO_2$ | 0.52 |
| $P_2O_5$ | 0.013 |

Example 2

An aqueous solution (10 kg.) of hydrochloric acid containing hydrosilicofluoric acid (HF 7.60%, $H_2SiF_6$ 1.23%), obtained by making the gas evolving during the sulfuric acid treatment of low quality fluorite absorbed in water, was mixed and agitated with hydrochloric acid (HCL 35.5%), 0.035 kg., (9.9% as HCl against $H_2SiF_6$), and the mixture was added together with sodium aluminate (Na$_3$AlO$_3$ 2.53%), 41.6 kg., simultaneously into a reaction vessel. The reaction temperature was maintained at 60° C. and the pH at 3.8–4.0 while the mixture was vigorously agitated for 10 minutes whereupon the formed crystals (concentration of suspending, crystalline cryolite about 28 g./liter) were precipiated. The supernatant was drawn off to make a thick slurry which was calcined at 510° C. for 15 minutes to obtain 1.37 kg. of synthetic cryolite.

Analysis of the produced cryolite was as follows:

| | Percent |
|---|---|
| $H_2O$ | 0.06 |
| $Na_2O$ | 42.51 |
| $Al_2O_3$ | 26.14 |
| F | 53.84 |
| $SiO_2$ | 0.41 |
| $P_2O_5$ | Trace |

Example 3

Hydrosilicofluoric acid ($H_2SiF_6$ 15.32%, $P_2O_5$ 0.006%) that was obtained by the condensing, after washing, of exhaust gas from concentrating wet process phosphoric acid, 5.1 kg./hr., was mixed and agitated with dilute sulfuric acid ($H_2SO_4$ 57.5%), 0.132 kg./hr. (9.7% as $H_2SO_4$ against $H_2SiF_6$) and water, 20.4 liters/hr. The mixture was allowed to react with sodium aluminate solution (Na$_3$AlO$_3$ 3.57%), 24 kg./hr. to make the concentration of the formed cryolite suspension about 21 g./liter, by procedure similar to Example 1, and 1.0 kg./hr. of synthetic cryolite was obtained.

Analysis of the produced cryolite was as follows:

| | Percent |
|---|---|
| $H_2O$ | 0.06 |
| $Na_2O$ | 42.00 |
| $Al_2O_3$ | 26.25 |
| F | 53.62 |
| $SiO_2$ | 0.48 |
| $P_2O_5$ | 0.018 |

Thus, in the method of the present invention, hydrofluoric acid or hydrosilicofluoric acid can be employed even in an impure state, and when such impure hydrosilicofluoric acid obtained by simple acid decomposition or decomposition after the addition of chloride or nitrate is employed as the starting material, the synthetic cryolite in which impurities have been eliminated to less than 1% can be obtained in a highly economical manner.

What is claimed is:

1. In the method of manufacturing synthetic cryolite through the reaction of sodium aluminate solution and a member selected from the group consisting of a solution of hydrosilicofluoric acid and a solution of hydrosilicofluoric acid and a solution of hydrosilicofluoric acid and hydrofluoric acid, the improvement which comprises conducting the reaction in the presence of from 5 to 20% by weight of at least one mineral acid selected from the group consisting of hydrochloric acid, nitric acid and sulfuric acid at a pH of from 3.5 to 4.5 with the concentration of the reactants being such that the slurry of cryolite thereby formed has a concentration of from 10 to 50 g./liter.

2. The improvement according to claim 1 further characterized in that the reaction is conducted in the presence of from 10 to 20% by weight of at least one of said mineral acids and the concentration of the reactants is such that the slurry of cryolite thereby formed has a concentration of from 20 to 30 g./liter.

References Cited
UNITED STATES PATENTS
2,058,075 10/1936 Gaither _____ 23—88
3,563,699 2/1971 Cuneo _____ 23—88

FOREIGN PATENTS
837,796 6/1960 Great Britain _____ 23—88
49,862 12/1931 Norway _____ 23—88

EDWARD STERN, Primary Examiner